United States Patent [19]

Stannard

[11] 4,149,921

[45] Apr. 17, 1979

[54] ELASTOMER COATED FABRIC PROVIDED BY A CASTING PROCESS

[76] Inventor: Donald H. Stannard, 730 Forestdale, West Covina, Calif. 91790

[21] Appl. No.: 779,067

[22] Filed: Mar. 18, 1977

Related U.S. Application Data

[62] Division of Ser. No. 652,411, Jan. 26, 1976, abandoned.

[51] Int. Cl.[2] ........................ B32B 1/02; B32B 25/10; B65D 37/00; B65D 89/00

[52] U.S. Cl. ..................................... 156/246; 150/0.5; 229/3.5 R; 244/135 B; 428/264; 428/265; 428/267; 428/425

[58] Field of Search ............... 428/264, 267, 425, 492, 428/496, 909, 265, 35; 156/246; 244/135 B; 220/63 A; 229/3.5 R; 150/0.5

[56] References Cited

U.S. PATENT DOCUMENTS

| | | | |
|---|---|---|---|
| 2,648,619 | 8/1953 | Alderfer | 156/246 |
| 3,046,177 | 7/1962 | Hankins | 156/246 |
| 3,127,135 | 3/1964 | Burr et al. | 428/492 |
| 3,527,654 | 9/1970 | Jones et al. | 428/264 |
| 3,794,548 | 2/1974 | Wirth et al. | 428/264 |
| 3,801,425 | 4/1974 | Cook | 428/35 |
| 3,837,959 | 9/1974 | Bishop | 156/246 |
| 3,929,949 | 12/1975 | Dag et al. | 428/264 |
| 3,933,548 | 1/1976 | Anderson et al. | 156/246 |
| 3,951,190 | 4/1976 | Suter | 428/35 |
| 3,959,049 | 5/1976 | Tanaka et al. | 156/246 |
| 3,989,869 | 11/1976 | Neumaier et al. | 428/425 |

*Primary Examiner*—James C. Cannon
*Attorney, Agent, or Firm*—Edward J. DaRin

[57] ABSTRACT

A coated fabric having a cured, synthetic elastomeric compound bonded thereto in a fashion to control the final weight and other physical and chemical properties thereof. The method comprehends the exposure of a fabric to an elastomer during its pot life to allow it to penetrate the fabric under "blotting" conditions and then quickly curing the elastomeric compound.

18 Claims, 7 Drawing Figures

ELASTOMER COATED FABRIC PROVIDED BY A CASTING PROCESS

CROSS REFERENCE TO RELATED APPLICATIONS

Figure 1A:
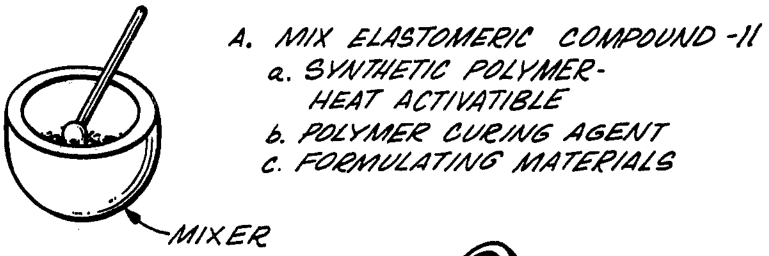
Figure 1B:
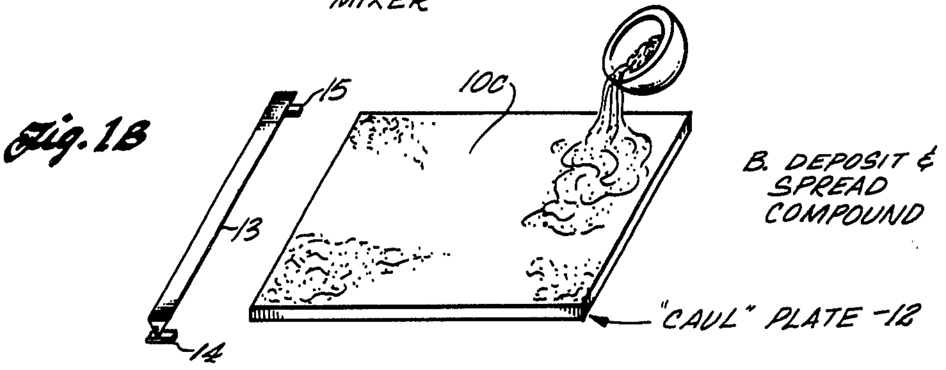

This is a division of application Ser. No. 652,411 filed on Jan. 26, 1976, now abandoned.

DISCLOSURE OF THE INVENTION

This invention relates to a method of manufacturing coated fabrics and/or layers or films of a synthetic elastomeric compound.

At the present time, fuel cells, or tanks, are employed on aircraft that are constructed of lightweight, non-metallic materials. The fuel cells that are used on aircraft must be constructed of material that has preselected physical properties and chemical resistant properties. These physical properties are particularly important for the manufacture of fuel cells that are utilized on helicopters. In the manufacture of a helicopter, the fuel cell must be sufficiently flexible so that it may be readily assembled with a minimum amount of time and effort into the storage area designed into the aircraft for the storage of the cell or tank. In addition to the usual physical properties that are required for a fuel cell, namely tough abrasion resistance, leakproof and chemical resistance, the fuel cell materials should have preselected, predictable weights for present day use. Aircraft fuel cells have been constructed in the past of rubber or rubber compounds due to the advantages inherent in the use of rubber or rubber compounds. Plastic coated fabrics have been utilized in the construction of fuel cells and have replaced rubber cells due to the superior physical properties exhibited by certain plastic coated fabrics. To this end, urethane coated fabrics have replaced fuel cells constructed of rubber due to the superior properties exhibited by the urethane plastic. Various types of fabrics, including synthetic fabrics, have been employed in combination with urethane plastics in the past. Most of these prior art fuel cells have been constructed by conventional fabricating techniques including molding or casting of the rubber and rubber compounds and the plastic coated fabrics. Since weight is such an important factor in the construction of an item to be employed on an aircraft, such as a helicopter, it is important to be able to periodically control the weight of the material during its manufacture prior to being employed in the manufacture of an item such as a fuel cell. In the construction of plastic coated fabrics for use in fuel cells, there has been no simple, inexpensive technique developed for coating a fabric to be used for a fuel cell and yet control the thickness of the coating and thereby the weight of the resulting fuel cell without resorting to conventional methods. One of the reasons that the weight of a coated fabric has not been controlled to the extent that the weight of the resulting end product falls within specified limits is that there has been a failure to control the extent of the penetration of the plastic material into the fabric resulting in varying weights of fabric and physical and chemical resistant properties when conventional manufacturing techniques are employed.

In the use of plastic coated fabrics, I have found that the complete "wetting" of a fabric is not desirable for at least three reasons that affect the resulting physical properties of the material. One reason is that a plastic saturated fabric does not exhibit the "tear" resistance of a film or coating laid onto or bonded to the surface of the fibers. Secondly, because of the uneven rate of saturation of the plastic into the fabric, it is difficult to maintain a uniform thickness and therefore the weight of the plastic coated fabric. Thirdly, when the conventional coating process is employed for plastic coating of a fabric, air is employed during the manufacturing technique and is conveyed through the fabric up into the plastic material. It has been found that much of the air remains entrapped in the plastic material in the form of bubbles resulting in "pinholes". Accordingly, there is a need for an improved and relatively inexpensive technique for fabricating a coated fabric that may be manufactured by a process for controlling the thickness of the plastic coating and its penetration into the fabric proper and thereby the total weight of the resulting product.

The present invention provides an improved and relatively inexpensive plastic coated fabric that is useful in the manufacture of fuel cells and many end products that require physical and/or chemical properties similar to the materials required for use in fuel cells. To this end, the process of the present invention allows the plastic coating thickness to be controlled and a wide range of substrate materials to be used with selected plastics. Some of the end products that the coated fabric of the present invention may be used for, in addition to fuel cells, are conveyor belts, liners for chutes or troughs used for handling abrasive materials, ink pads for the printing industry, large chemical holding tanks, "B" staged fabrics used in the molding industry, etc. The coated fabrics produced in accordance with the present invention exhibit physical properties including outstanding abrasion resistance, high tensile strength, superior tear strength, good flexing resistance and excellent oil, solvent and ozone and similar chemical resistance properties.

From an end product standpoint, the present invention comprehends a coated fabric having a cured layer of a synthetic, elastomeric compound bonded to and impregnating the fabric without saturation of the fabric by the compound. The synthetic compound may be any heat activated plastic material and utilized with substrates of both synthetic and natural fibers. The synthetic, elastomeric compounds are preselected on the basis of physical and chemical properties required for the end use of the coated fabric. The end product produced in accordance with the present invention may also be a film or a layer of synthetic, elastomeric compound of a uniform thickness throughout.

From a method standpoint, the present invention for manufacturing a coated fabric having a preselected weight and physical properties includes the steps of preparing a synthetic, elastomeric compound including the curing agent in combination with preselected formulating materials. The materials comprising the compound are selected so that the coated end product exhibits preselected physical properties. The prepared compound is further controlled to exhibit a preselected viscosity at approximately ambient temperatures in accordance with the construction of the fabric selected to be coated. In the use of one plastic, the prepared compound is in the form of a semi-solid and has a short pot life on the order of 3 minutes. The thus prepared compound is spread over the surface to cover the preselected surface area and to a preselected uniform depth throughout the covered surface area. The positioning of the fabric to be coated is the next step in the procedure and the fabric is placed over the top of the exposed surface of the compound, without exerting any pressure on the fabric, to allow the compound to become impregnated into the fabric in accordance with the preselected physical construction and the weight of the fabric for a preselected viscosity of the compound during the time interval of the pot life of the compound and then quickly subjecting the compound impregnated fabric to heat in the range of 200° Fahrenheit for a preselected time period to cure the compound and thereby provide the coated fabric having the desired weight and physical properties.

This same procedure may be utilized as described hereinabove for the manufacture of a thin film of a synthetic elastomeric compound without a substrate but having a preselected uniform depth.

From a method standpoint, the present invention comprehends preparing a synthetic elastomeric compound including a curing agent in combination with the preselected formulating materials wherein the materials are selected so that the coated product exhibits preselected physical properties. The compound is prepared to exhibit a preselected viscosity at approximately ambient temperature in accordance with the physical construction of the fabric to be coated. The prepared compound is in a semi-solid state and spread over a surface to cover a preselected area and to a preselected uniform depth throughout. A fabric to be coated is positioned over the top surface of the compound, without exerting any pressure on the fabric, to allow the compound to be impregnated into the fabric in accordance with the physical cnstruction and weight of the fabric and the preselected viscosity of the compound, and then quickly subjecting the compound impregnated fabric to heat in the range of 200° Fahrenheit for a preselected time period to cure the compound and thereby provide the coated fabric as an end product.

Figure 2:
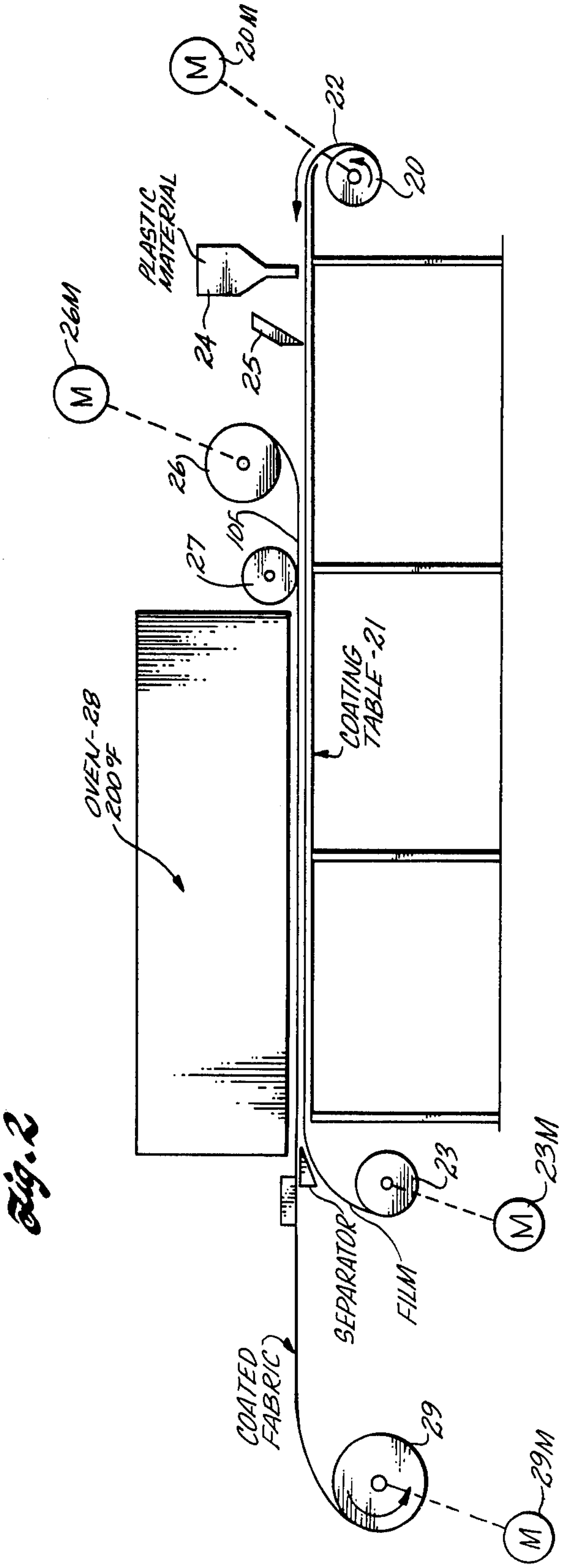

These and other features of the present invention may be more fully appreciated when considered in the light of the following specification and drawings, in which:

FIG. 1 comprises FIGS. 1A–1F which diagrammatically illustrate a method of manufacturing a coated fabric on a step-by-step basis and embodying the present invention;

FIG. 2 is a diagrammatical representation of a method of manufacturing a coated fabric embodying the present invention wherein the fabric may be manufactured on a continuous basis.

Now referring to the drawing, the end product that may be manufactured in accordance with the method manufacture embodying the invention will be described in detail. The invention will be first described in terms of a manual method for manufacturing a coated fabric and in particular a coated fabric for use in the manufacture of a liquid container, a fuel cell or tank, for use on an aircraft helicopter. The particular physical and chemical properties required for a fuel cell to be employed on a helicopter, for example, are that it be constructed of materials that are physically tough from the standpoint of withstanding abrasion, have high tensile strength, be tear resistant, have good flexing resistance, be leakproof and be resistant to attacks from liquids such as fuels, fuel additives, oils and atmospheric conditions or environment to which it is exposed. The fabric should also be light in weight and the manufacturing process should include the ability to control the weight of the product within predictable tolerances while maintaining the aforementioned physical and chemical properties.

Figure 1C:
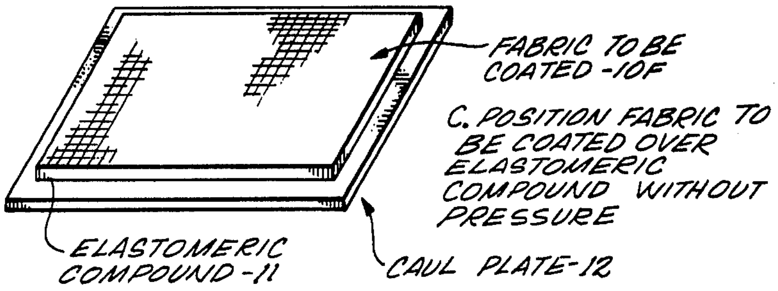
Figure 1D:
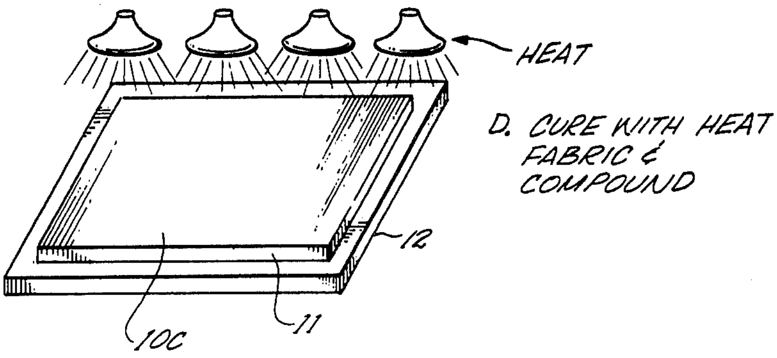
Figure 1E:
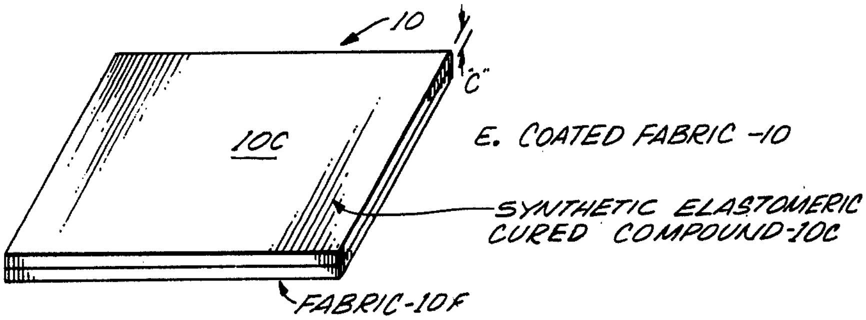
Figure 1F:
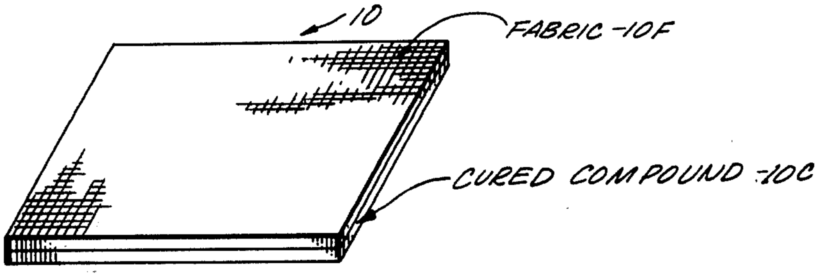

FIGS. 1E and 1F illustrate the coated fabric 10 that is manufactured in accordance with the present invention and comprises an uncoated fabric 10F having a cured synthetic, elastomeric compound 10C bonded to one surface of the fabric 10F and impregnating the fabric, without saturating it. As noted in FIG. 1F, in particular, the cured elastomeric compound 10C does not completely penetrate the fabric 10F so that the fabric is exposed on one side of the coated fabric 10, as is evident from examining FIG. 1F. The elastomer 10C is coextensive with the opposite surface of the fabric 10F and not only completely covers the fabric but also has a controlled thickness or depth "C", as illustrated in FIG. 1E. In one particular embodiment of the invention the cured, synthetic elastomeric compound 10C may be a synthetic elastomer including a urethane prepolymer mixed therein. One such urethane prepolymer is available from the Thiokol Chemical Division of the Thiokol Corporation located at 930 Lower Ferry Road, Trenton, N.J. The Thiokol urethane prepolymers are sold by the Thiokol Corporation under the trademark "Solithane" resins. The resulting synthetic elastomeric compound prepared through the use of the urethane resin is prepared by mixing a selected curing agent in combination with other preselected formulating materials so that the prepared elastomer exhibits a semi-solid viscosity at approximately ambient temperature and a three-minute pot life. The thus prepared compound is cured for bonding the compound to the fabric 10F by exposing it to a temperature of approximately 200° Fahrenheit. The urethane resin prepolymer is not the only type of plastic material that can be used in the method of manufacturing the fabric 10 in accordance with the teachings of the present invention. A urethane coating for a fabric is particularly advantageous in the manufacture of a helicopter fuel cell or similar liquid container due to the physical and chemical properties that the cured elastomer exhibits. However, it should be understood that any heat activated resin including polyester plastics may be used in the disclosed method. The particular plastic material to be employed in preparing the elastomeric compound will depend upon the desired physical properties required of the end product for which it is used and the particular type of fabric upon which it is to be coated.

For the purpose of this invention, any fabric may be employed with a heat activated plastic and satisfactory results may be obtained through the use of these fabrics including synthetic fabrics as well as natural fabrics. The substrate materials that have been successfully coated with synthetic elastomeric compounds in the manufacture of fuel cells for a heliocopter are nylon, rayon, aramid fiber sold by Du Pont under the trademark Kevlar, cotton and similar fabrics. The synthetic fabric nylon, for example, has been employed having different physical characteristics or weights of 2-ounce, 12-ounce or 15-ounce materials. There does not appear to be any limitation with respect to implementing the present invention relative to the substrate or fabric 10F that may be coated in accordance with the teachings of the present invention and yet obtain a good bond without fully saturating the fabric with the compound coated thereon.

A very important factor to be noted at this point is that the resins or urethanes that are sold by the Thiokol Corporation under the trademark "Solithane" are specified by this manufacturer to be processed by conventional casting or molding techniques. The usual end product for which the Solithane resins are employed is in the manufacture of casted or molded rollers, casters, mallet heads, etc., and similar parts requiring high abrasion and chemical resistance to oils, acids and similar liquids. The manufacturer does not recommend that such urethane resins be processed other than by casting or molding techniques due to the very short pot life of the resulting elastomer. As noted above, the pot life of the urethane elastomers is on the order of three minutes after which the compound will solidify and whereby the processing becomes very difficult unless the coating is immediately cured. In accordance with the present invention, however, the manufacturer's recommended procedures for preparing the elastomer are followed. In following these recommended procedures for mixing in the curing agent and the formulating materials no mechanical means are employed such as mixing and deaerating equipment.

The method of manufacturing a coated fabric in accordance with the present invention may be characterized as a "reverse" coating procedure that has resulted from my attempting to coat a fabric with the Solithane urethane resins and experiencing that the "wetting" or penetration of the plastic into the fabric was not predictable and many coats of the plastic had to be applied to the fabric to assure that a leakproof coating was produced. Although this procedure would produce a product that exhibited physically strong properties, the manufacturing procedure was unacceptable and relatively expensive.

Now referring to FIGS. 1A–1D, the sequential steps for producing the coated fabric 10 utilizing a urethane prepolymer for the elastomeric coating will be examined in detail. The first step in the procedure is the mixing of the elastomeric compound for use in the reverse coating procedures. The compound for the substrate coating is a heat activated synthetic polymer such as the urethane polymer commercially available from the Chemical Division of the Thiokol Corporation of New Jersey. Along with this selected prepolymer, a polymer curing agent is mixed in with selected formulating materials to produce the desired compound. The selection of these materials is governed by the desired physical and chemical properties that the end product should exhibit as well as the physical properties of the fabric to be coated. Once the elastomeric compound is prepared, it is deposited on a stationary plate which is identified as a "caul" plate 12. The compound 10C is spread over a preselected area and to a preselected uniform thickness on the caul plate 12. To obtain a uniform thickness throughout the compound 11, the compound may be spread on the caul plate by means of a scraper bar 13. The bar 13 may be provided with shims 14 and 15 adjacent each end and the shims are provided with a thickness in accordance with the desired thickness of the coating or compound 11 for the coated fabric 10. To assure that no pinholes exist in the final product and which pinholes may be caused by dust and air entrained in the mixed compound, a number of coats of the compound may be applied to the plate 12. If the compound is mixed by mechanical means, for example, these extra steps may be omitted.

After the compound 10C is finally prepared to the right depth on the selected area of the caul plate 12, the fabric 10F will be positioned or rolled over the exposed surface of the compound 10C. The fabric 10F is placed over the elastomer's surface without any pressure exerted on the fabric. The fabric 10F is illustrated in FIG. 1C in this position and is identified by the reference numeral 10F. It may be rolled onto the exposed surface of the compound 10C while minimizing the pressure exerted on the fabric 16. In accordance with the present invention, it is desired that the penetration of the compound 10C into the fabric 10F be governed by the physical properties including the weight of the fabric 10F and the viscosity of the elastomeric compound 10C. The penetration or absorption of the compound 10C into the fabric 10F may be considered to be a "blotting" or "soaking up" of the compound by the fabric 10F, but without pressure, and in this fashion the penetration of the plastic into the fabric is controlled without completely saturating the fabric. It is desired that the basic pressure applied during this step of the method is the weight of the fabric.

After the fabric 10F is so positioned and before the expiration of the time interval representing the pot life of the compound 10C, the combination of the fabric 10F and the compound 10C is exposed to a curing station wherein heat is applied thereto at a temperature on the order of 200° Fahrenheit. During this heating stage, the elastomeric compound is cured and bonded to the fabric. Once the curing interval has expired, the resulting coated fabric 10 will be removed from the caul plate 12 to be utilized for its intended purpose. The coated fabric 10 will appear as illustrated diagrammatically in FIGS. 1E and 1F with the coating 11 essentially on one side of the fabric 10F. At this point, it should be noted that the caul plate 12 may have a preselected pattern recorded thereon and which pattern is to be transferred to the cured plastic compound after it is removed from the plate 12. Such a pattern, for example, may be an outline to be used for cutting and further fabrication of the completed end product.

Now referring to FIG. 2, the diagrammatic representation of an arrangement for manufacturing the coated fabric 10 on a continuous basis will be examined. The plastic material, such as the urethane resin, is deposited on a temporary carrier or conveyor for continuously advancing the plastic material to be processed through the various stations or method steps required. To this end, the carrier or conveyor may comprise a spool 20 storing a continuous length of Teflon film 22 arranged adjacent one end of a coating table 21. The conveyor material 22 is advanced to a take-up spool 23 for storing the conveyor material or Teflon film as it advances through each of the stations required for processing the fabric 10F. The film supply spool 20 and the take-up spool 23 may be controlled in a conventional fashion by individual drive motors 20M and 23M as diagrammatically illustrated. The speed with which the conveyor material is advanced through the various stations is in accordance with the pot life of the elastomeric compound being employed as well as the physical property of the fabric in order to properly produce the coated fabric 10. For the purposes of depositing the plastic material onto the Teflon conveyor material 22, a traversing head 24 is employed. The traversing head 24 stores the elastomeric compound 10C to be coated on the fabric 10F and traverses the area above the conveyor material 22 to cover a preselected area thereon. A knife-edged thickness control device 25 is set to the proper height above the material 22 to spread and maintain the deposited plastic compound to a desired uniform thickness throughout. This spread-out plastic layer 10C is then advanced towards the fabric 10F to be coated which is stored on an individual fabric storage spool 26 and advanced into engagement with the top surface of the advancing layer of plastic for absorbing the plastic as it is positioned thereon. The fabric spool 26 is controlled by an individual control motor 26M along with the provision of the guide rollers 27 to assure the exact registration between the fabric 10F and the exposed surface of the compound layer 10C.

After the fabric 10F is positioned over the layer of compound 10C, without exerting any pressure on the fabric 10F, it is quickly advanced to a curing station illustrated in FIG. 2 as an oven 28. The oven 28 provides a heating zone having a temperature on the order of 200° Fahrenheit to cure the plastic compound, bond it to the fabric and provide the desired coated end product. It will be appreciated that the traversal time through the oven 28 is selected to allow sufficient time for the plastic to be cured and bonded to the fabric 10F. After the cured, coated fabric 10 emerges from the oven 28, the carrier film 22 is stripped from the coated fabric and stored on its individual supply reel 23. Similarly, the coated fabric 10 having the conveyor material 22 stripped therefrom may be stored on an individual storage reel 29 as it is advanced thereto. The storage reel 29 for the coated fabric 10 is controlled in the same fashion as each of the other reels in the system by an individual motor 29M.

As in the previous embodiment, a pattern may be transferred onto the adjacent surface of the compound during the manufacturing procedure. In this embodiment, the conveyor material 22 may have a design, or a pattern, recorded thereon so that it will be transferred to the cured plastic material and be visible once the material 22 is stripped therefrom. This pattern, as in the previous embodiment, is used for cutting and/or fabricating the coated fabric 10 into the desired material or end product.

In accordance with the above procedures, then, the coated fabric 10 that is produced may be used in the manufacture of a liquid container such as a helicopter fuel cell and also in many other end products such as conveyor belts, chutes, troughs, etc. This result is due to the ability to control the thickness of the coating and its penetration into the fabric 10C and thereby the weight. To this end, it will be appreciated that the end product prepared in accordance with the above teachings may eliminate the fabric and merely provide a thin film of plastic compound having a substantially uniform thickness for use in conjunction with other substrates and bonded thereto by more conventional techniques. It has been found that when a urethane plastic, for example, is used as a prepolymer in the elastomeric compound for coating a fabric that it compares favorably with the rubber when used in similar applications. A urethane coated fabric 10 exhibits a wide range of fuel and chemical resistance as well as being very resistant to ozone and ultra-violet light. Incandescent lights appear to have little effect on the coated fabric. The abrasion resistance of the coated fabric 10 is three times better than natural rubber. The coated fabric 10 is well suited to utilize mass production techniques for the manufacture of helicopter fuel cells. The prepared elastomeric compound can be handled in an uncured or "B" stage since it is not tacky. The urethane as utilized and obtained from the manufacturer is in a 100 percent solid state. As contrasted with the use of rubber, for example, the type of rubber employed must be changed in accordance with the chemicals or the fuels to which it may be subjected. Rubber is known to have poor resistance to ultra-violet light and ozone. The shelf life of a rubber product is such that it must be packed in a carton when stored in a warehouse, etc. It has also been found that when a helicopter fuel cell is constructed of a butyl or nitrate rubber that it exhibits poor resistance to abrasion and such synthetic rubbers are not as good as natural rubber. Since the surface of rubber is tacky, it must be carefully handled and the number of hours of labor for processing the rubber is very high. Rubber molds are not reusable and the number of rejects in the manufacture of rubber products is very high during the manufacturing procedure. The number of fabrics that may be coated with rubber is limited as compared to the fabrics coated according to the procedures of the present invention. Some fabrics require that a primer be used with it for rubber coating purposes. In a rubber product, the seams must be bonded with an adhesive having a solvent as a thinner. The solvent must "flash off" dry or a blister will form from the gassing during the manufacturing procedures.

What is claimed is:

1. A method of manufacturing a flexible, abrasion resistant, leakproof fabric having excellent fuel, fuel additive, oil, solvent and ozone resistance properties having a preselected weight including the steps of spreading a synthetic elastomeric compound including a heat activated resin and a curing agent over a preselected area to a preselected uniform depth in accordance with the desired weight for the coated fabric, the compound having a pot life on the order of three minutes, positioning a fabric to be coated with said compound over the top surface of the layer of said compound, without exerting any mechanical pressure on the fabric, to allow it to lightly lie thereover whereby the fabric absorbs the elastomeric compound, the penetration of the compound into the fabric being governed by the weight of the fabric and the viscosity of the compound without saturating the fabric with the compound, and then quickly applying heat to the thus impregnated fabric for curing the synthetic elastomeric compound prior to the expiration of the time interval of the pot life of the compound.

2. A method of manufacturing a coated fabric as defined in claim 1 wherein the heat activated resin includes a urethane prepolymer.

3. A method of manufacturing a coated fabric as defined in claim 1 wherein the fabric to be coated is a synthetic fabric having a preselected weight.

4. A method of manufacturing a coated fabric as defined in claim 3 wherein the synthetic fabric is a nylon fabric having a preselected weight.

5. A method of manufacturing a coated fabric as defined in claim 3 wherein the synthetic fabric is an aramid fiber fabric having a preselected weight.

6. A method of manufacturing a coated fabric as defined in claim 3 wherein the synthetic fabric is a rayon fabric.

7. A method of manufacturing a coated fabric as defined in claim 1 wherein the fabric to be coated is a natural fiber fabric having a preselected weight.

8. A method of manufacturing a coated fabric as defined in claim 7 wherein the fabric is cotton.

9. A method of manufacturing a coated fabric as defined in claim 1 wherein the impregnated fabric is heated to approximately 200° Fahrenheit.

10. A method of manufacturing a coated fabric as defined in claim 1 including the step of permanently recording a preselected pattern onto the compound exposed surface of the coated fabric while processing the fabric and compound.

11. A method of manufacturing a coated fabric as defined in claim 10 including recording a preselected pattern on the surface to receive the synthetic elastomeric compound thereon and causing the preselected pattern to be permanently recorded on the adjacent surface of the compound by contact transfer during the coating of the fabric so that it is rendered visible when the cured and coated fabric is removed from said surface.

12. A method of manufacturing a flexible, abrasion resistant, leakproof fabric having excellent fuel, fuel additive, oil, solvent and ozone resistance properties having a desired weight including the steps of spreading a semi-solid heat activated plastic compound over a preselected area to a preselected uniform depth, the compound including a curing agent and exhibiting a preselected viscosity and a very short pot life on the order of 3 minutes, positioning a fabric to be coated over the top surface of the layer of the plastic compound to cause without exerting any mechanical pressure on the fabric, the plastic material to be absorbed into the fabric and penetrate into the fabric in accordance with the weight of the fabric and the visosity of the compound without saturating the fabric with the compound, heating the plastic compound and the fabric to cure the plastic compound and bond the compound thereto.

13. A method of manufacturing a flexible, abrasion resistant, leakproof fabric having excellent fuel, fuel additive, oil, solvent and ozone resistance properties having a preselected weight and physical properties including the steps of preparing a synthetic elastomeric compound including a curing agent in combination with preselected formulating materials, the materials being selected so that the coated product exhibits preselected physical properties, the compound being prepared to exhibit a preselected viscosity at approximately ambient temperature in accordance with the physical construction of the fabric to be coated, the prepared compound, being in a semi-solid state and having a very short pot life on the order of 3 minutes, spreading the thus prepared elastomeric compound over a surface to cover a preselected surface area and to a preselected uniform depth throughout the covered surface area, the layer of said compound being carefully prepared to eliminate any very small holes such as produced by air or dust entrained therein, positioning a fabric to be coated over the top surface of the compound, without exerting any mechanical pressure on the fabric to allow the compound to be impregnated into the fabric in accordance with the physical construction and weight of the fabric and the preselected viscosity of the compound without saturating the fabric with the compound, and then quickly subjecting the compound impregnated fabric to heat in the range of 200° Fahrenheit for a preselected time period to cure the compound within the pot life of the compound and thereby provide the coated fabric end product.

14. A method of manufacturing a flexible, abrasion resistant, leakproof fabric having excellent fuel, fuel additive, oil, solvent and ozone resistance properties including the steps of continuously advancing a continuous length of carrier material over a preselected path, continuously depositing a layer of a synthetic elastomeric compound having a pot life on the order of 3 minutes including a curing agent mixed therein and being in a substantially semi-solid state across a preselected width of the carrier material, spreading the deposited compound on the carrier material to a substantially uniform depth throughout the selected width on the carrier material, continuously advancing a continuous length of a fabric to be coated onto the top surface of the compound advancing with the carrier material to cause, without exerting any mechanical pressure on the fabric, the compound to impregnate the fabric with a blotting effect without saturating the fabric with the compound, continuously advancing the carrier material transporting the impregnated fabric through a compound heat curing station for curing the compound and after the advancing cured compound impregnated and bonded to the fabric advances out of the curing station, stripping the carrier material from the cured compound.

15. A method of manufacturing as defined in claim 14 wherein the heat curing station comprises a curing oven maintained at a temperature of approximately 200° Fahrenheit.

16. A method of manufacturing a coated fabric as defined in claim 14 wherein a supply reel having a preselected fabric to be coated stored thereon is unwound therefrom for postioning on the compound.

17. A method of manufacturing a coated fabric as defined in claim 14 wherein the carrier material comprises a supply reel having a film stored thereon and a take-up reel for winding the film thereon after the film is stripped from the cured compound.

18. A method of manufacturing a coated fabric as defined in claim 17 wherein the carrier film is provided with a preselected pattern recorded thereon on one side of the film, and said film is advanced with said one side being exposed to compound deposited thereon to transfer the preselected pattern onto the adjacent surface of the compound to permanently record the pattern on the cured compound.

* * * * *